April 26, 1938.  J. EGGERT ET AL  2,115,198
ENGRAVING ROLLER FOR THE MANUFACTURE OF LENTICULAR FILM
Filed Feb. 19, 1934
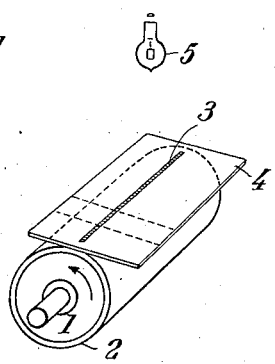
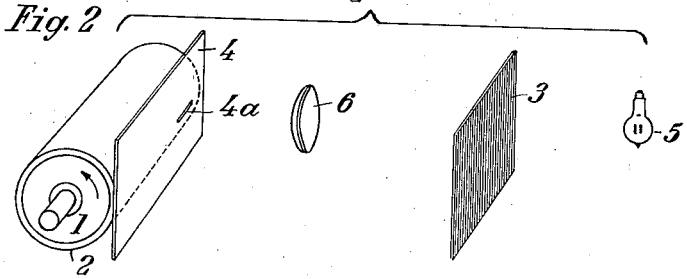
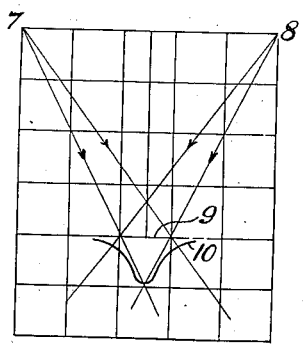
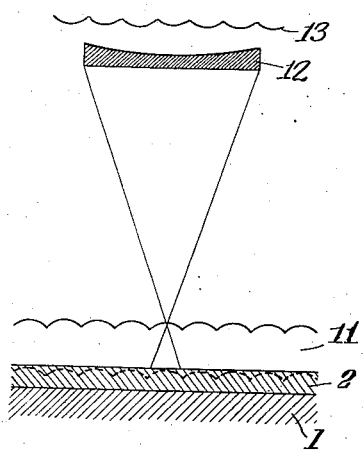
Inventors:
John Eggert
Franz Weil,
by Potter, Pierce & Scheffler,
Attorneys.

Patented Apr. 26, 1938

2,115,198

UNITED STATES PATENT OFFICE 2,115,198

ENGRAVING ROLLER FOR THE MANUFACTURE OF LENTICULAR FILM

John Eggert, Leipzig-Gohlis, and Franz Weil, Dessau in Anhalt, Germany, assignors to I. G. Farbenindustrie Aktiengesellschaft, Frankfort-on-the-Main, Germany Application February 19, 1934, Serial No. 712,079
In Germany February 22, 1933

1 Claim. (Cl. 95—5.6)

Our present invention relates to the manufacture of lenticular films.

One of its objects is a process of manufacturing an engraving roller for the manufacture of goffered films. Further objects will be seen from the detailed specification following hereafter. Reference is made to the accompanying drawing in which Figs. 1 and 2 show diagrammatically arrangements for producing goffered films according to our invention, Fig. 3 shows the influence of the source of light when manufacturing the goffered film by means of a line-screen, and Fig. 4 shows an arrangement for manufacturing goffered film with the aid of a lenticular film.

In making goffered films it has been the practice to emboss the film itself or the support for casting the film at a suitable pressure and a suitable temperature, by means of an engraved roller or a roller wound with wire. There is difficulty, however, in producing film embossing rollers or dies having the required degree of accuracy. Moreover embossings of any desired fineness cannot be produced without impairing their uniformity.

According to this invention these difficulties are avoided or minimized by coating the roller with a light-sensitive layer and producing the required goffering thereon in the form of a hardened photographic relief. Contrary to expectation it has been found that a metal roller coated with a hardened gelatin relief meets the mechanical and thermal requirements for its use in making the goffered film. The embossing of the film or of the casting support by means of the roller is preferably performed at a raised temperature, for instance, 80 to 120° C. If required, the film or the support may be pretreated with a solvent or a swelling agent. The engraved support may be saponified before use.

For the preparation of a light-sensitive layer for coating the roller any light-sensitive substances are suitable which after exposure can be converted into a relief, for instance, layers of gelatin containing bichromate or layers of gelatin containing silver halide or layers of a cellulose derivative sensitized with bichromate or a diazo compound, that is to say any layer which by exposure becomes changed in solubility or tendency to swell. This layer is photographically printed, either by contact or optically with the pattern required for the goffering, for instance, the lenticular elements required for the film. Printing the elements of a screen optically presents the advantage that the original screen may simultaneously be reduced, so that a screen of any desired fineness may be obtained. Since the screen pattern is mostly arranged on a level plane, a mask is placed, during the printing operation, on the screen a slot in the mask being coincident with the line of contact of the cylinder with the screen so that only a narrow band of the tangential zone of the screen is incident on the roller. A special advantage of the invention lies in the fact that the screen elements may have any desired position and shape. This was impossible in the method hitherto known, of making embossing cylinders as the treatment of the metal surface of the cylinder was dependent on certain well known forms and positions of the lenticular elements.

The exposed layer is converted into a relief by removing the soluble portions. By varying the thickness of the light-sensitive layer and the concentration of the light-sensitive substance within the layer and by varying the intensity of light and the temperature at which the exposed layer is washed, lenticular screens may be obtained in any required form, for instance, with regard to the radius of curvature, said form depending in each particular case on the conditions required for the cylinder lenses of the film.

The process of manufacturing lenticular films which is contemplated is more fully explained with reference to the accompanying drawing. Referring to Fig. 1, I is a metal roller covered with a layer 2 of gelatin sensitized by means of bichromate. The axle of the roller I is connected with a guide spindle (not represented). Immediately above the layer 2 there is arranged a line-screen 3 tangentially to the roller surface. Owing to the slotted mask 4 only a narrow band of the screen 3 is illuminated by the source of light 5. The roller is slowly rotated during the exposure.

When using a line-screen shorter than the length of the roller, the roller must be axially displaced after each revolution by the length of the slot.

Fig. 2 represents diagrammatically the arrangement of the different elements in printing the screen optically. I is the cylinder coated with a light-sensitive layer 2 of gelatin sensitized by means of bichromate. Close to the cylinder there is placed the mask 4 having an opening 4a. Through this opening the line-screen is projected on to the surface of the cylinder by means of the objective 6 and the source of light 5. After each revolution the roller is axially shifted by the length of the opening 4a or vice versa.

A film provided with lenticular screen elements having a sharp separation line between two adjacent elements may be obtained by printing a line-screen by means of a source of light of great aperture. The relations are shown in Fig. 3 wherein 9 is a line of the line-screen, 7 and 8 indicate a source of light, and 10 is the light sensitive layer on the goffering roller. Instead of a source of light with great aperture there can also be used a source of light with small aperture if it is reciprocated between 7 and 8 or if the engraving roller is turned correspondingly. As seen from the trace of the rays drawn in Fig. 3 there is produced behind each line of the line-screen a core shadow and a half shadow of decreasing intensity. The sharpness of the transition from one screen element to another may furthermore be influenced by the concentration of the hardening agent and/or the developing agent. By these means an unobjectionable form for providing a film with lenticular elements is obtainable.

For the same purpose there may be used instead of a line-screen, a lenticular film which has been obtained according to the aforesaid method or to any other method. An arrangement for this purpose is diagrammatically shown in Fig. 4 wherein 1 indicates a roller to which there has been applied the light-sensitive layer 2. The lenticular blank film 11 is placed over the light-sensitive layer 2, and the light-sensitive layer 2 is exposed through the lenticular film 11 and a grey wedge 12 having a breadth so that it is seen from the middle of the film under an angle corresponding with the aperture of the lenticular elements, said grey wedge 12 being illuminated by means of a source of light 13. The form of the grey wedge is so selected that the middle part has the greatest transparency and that the gradient of the transparency yields after exposure and removal of the soluble portions of the layer 2 lenticular elements having the required radius of curvature, inasmuch as the light affects the sensitive layer 2 proportionally to the transparency of the grey wedge 12.

The following example illustrates the invention:

A chrome-plated steel roller of about 20 cm. length and provided with a preparatory layer is slowly rotated while dipping into a solution of gelatin and bichromate such as is used for the production of gelatin bichromate layers for relief purposes, heated to a temperature of 30 to 40° C. The temperature of the solution has an influence on the thickness of the layer. After the surface of the roller is coated with gelatin, the roller is removed from the solution and the gelatin is dried while rotating the roller. By these means the formation of streaks in the layer of gelatin is avoided. The gelatin layer is preferably given a thickness of about 0.1 to 0.2 mm. After the gelatin bichromate layer is dry the screen is printed on the light-sensitive layer, for instance, there may be used a line screen with 0.03 mm. distance between two lines. The roller is rotated while in tangential contact with the line-screen which as shown in Fig. 1, is covered by a mask having a slot-shaped aperture extending in the length of the roller. The light-sensitive layer is exposed by means of a source of light of suitable aperture, the aperture of the source of light having the above pointed out influence on the limiting zone or line between two adjacent screen elements. Then the layer is washed with warm water until the screen relief is left.

What we claim is:

A process of producing an engraving roller for the manufacture of lenticular film, which process comprises coating a roller with a light sensitive layer the solubility of which is capable of being changed by exposure to light, arranging a transparent lenticular film with the smooth side in contact with the light sensitive layer on said roller, exposing said light sensitive layer to light through a grey wedge spaced from the lenticular film and having a breadth so that the lenticular elements form images in the light sensitive layer which correspond in size to the size of the said elements of the lenticular film, said grey wedge having a transparency which decreases from its center towards its edges, and removing the soluble parts of said layer.

JOHN EGGERT.
FRANZ WEIL.